United States Patent [19]
Foley

[11] 3,736,429
[45] May 29, 1973

[54] RANDOM SOURCE INTERROGATION SYSTEM

[75] Inventor: John E. Foley, Alamos, N. Mex.

[73] Assignee: The United States of America as represented by the United States Atomic Energy Commission

[22] Filed: June 28, 1972

[21] Appl. No.: 266,961

[52] U.S. Cl. ......250/71.5 R, 250/83 SA, 250/106 SC
[51] Int. Cl. .............................................. G01j 39/18
[58] Field of Search .................. 250/83 SA, 71.5 R, 250/106 SC

[56] References Cited
UNITED STATES PATENTS

| | | | |
|---|---|---|---|
| 2,597,535 | 5/1952 | Segre | 250/106 SC |
| 3,597,596 | 8/1971 | Lawless | 250/106 SC |
| 3,018,374 | 1/1962 | Pritchett | 250/83 SA |
| 3,389,254 | 6/1968 | Russell | 250/71.5 R |

Primary Examiner—James W. Lawrence
Assistant Examiner—Harold A. Dixon
Attorney—Roland A. Anderson

[57] ABSTRACT

A system to assay fissionable material comprising a sample container, a neutron source of americium-lithium, lead shielding, a plastic scintillator neutron detector using fast photomultiplier tubes electrically connected to a coincidence logic system, and rotating the sample by any well known means along with varying the position of the said neutron source.

6 Claims, 1 Drawing Figure

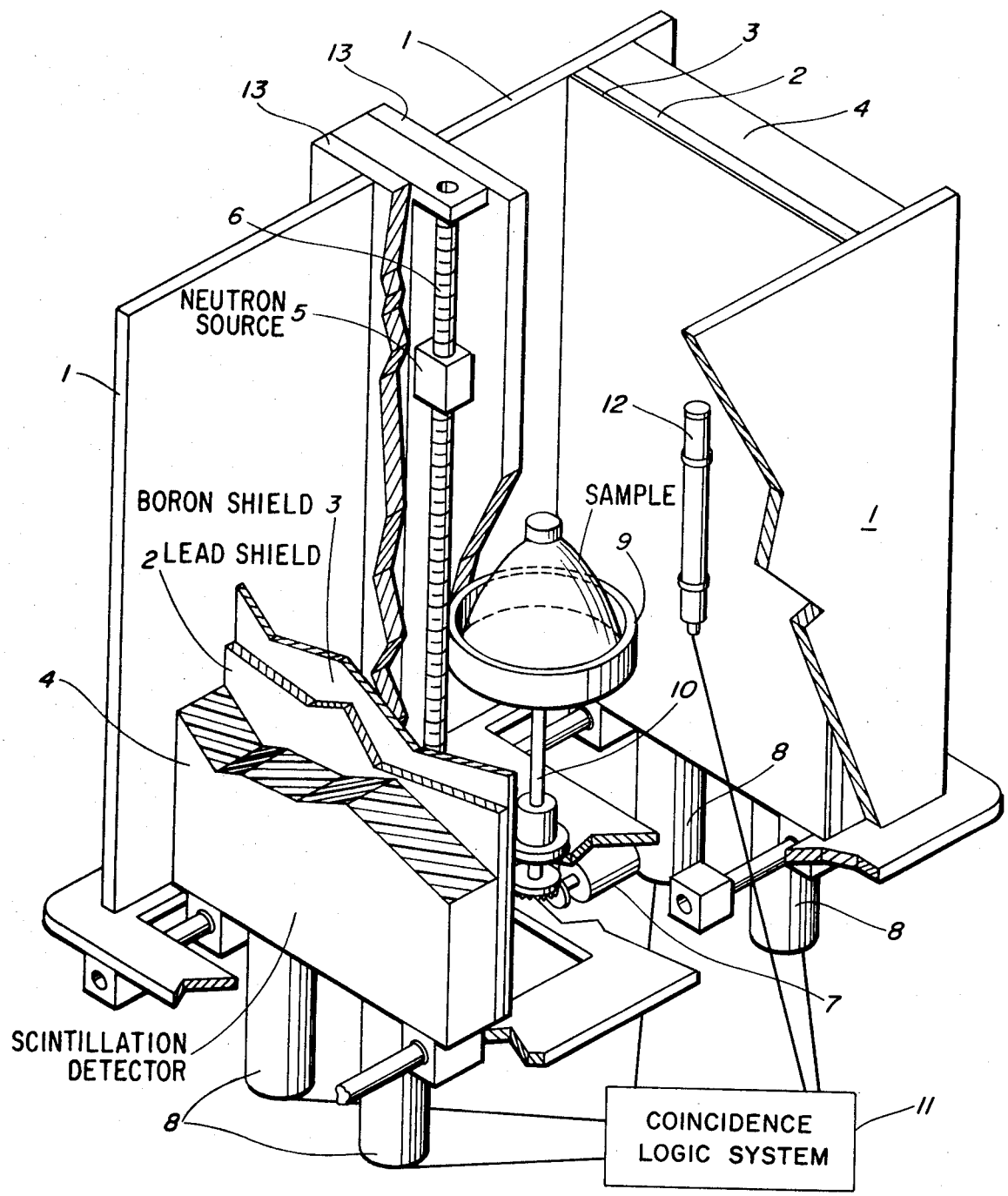

RANDOM SOURCE INTERROGATION SYSTEM

BACKGROUND OF THE INVENTION

The invention described herein was made in the course of, or under, a contract with the U. S. ATOMIC ENERGY COMMISSION.

Reliable, accurate and rapid nondestructive assay instrumentation is playing an increasingly important role in the practical implementation of nuclear material safeguards, inspection and surveillance as well as in quality control and operational safety in all types of nuclear processing facilities. The neutron coincidence counting technique has been successfully demonstrated for nondestructive assay of samples containing Pu or U. The technique involves detecting neutrons from the spontaneous fission of $^{240}$Pu and $^{238}$U with polyethylene moderated neutron coincidence counters containing $^3$He- or BF$_3$-filled detectors surrounding the sample to be assayed. The coincidence counting technique is necessary for reliable assay since total neutron count rate is dependent not only on the amount of Pu in the sample but also on the chemical composition. For example, if the sample contains PuO$_2$ the total neutron production rate would be $\approx$ 100 n/sec-g; however, if the sample contained PuF$_4$ the total rate would be $\approx$ 300 times larger than this. The spontaneous fission rate of both samples would be $\approx$ 25 fissions/sec-g for 5% $^{240}$Pu isotopic composition independent of chemical composition. By using the coincidence counting technique it is possible to distinguish spontaneous fission neutrons from the randomly produced ($\alpha$,n) neutrons. Thus, coincidence counting provides a powerful method for rapid and accurate assay of Pu-bearing samples. Recently, the use of fast plastic scintillation detectors has significantly extended the range of usefulness of the coincidence counting technique to materials with extremely high ($\alpha$,n) activities.

PRIOR RANDOM SOURCE INTERROGATION SYSTEMS

The $^{235}$U content of samples cannot be assayed by passive neutron counting because $^{235}$U does not fission spontaneously; however, it can be assayed indirectly as $^{238}$U does fission spontaneously at a very low rate, 0.007 fissions/sec-g. This assay techique is practical only for large masses of several kg of low-enriched material of known enrichment.

The use of plastic scintillation detectors, because of their short coincidence resolving times, has enabled practical assay of $^{235}$U and $^{239}$Pu using standard coincidence counting techniques by inducing fission in the $^{235}$U with a random neutron source located close to the sample inside the counter. This method, called the Random Source Interrogation Technique, was first used with a polyethylene-moderated $^3$He counter, but assay times were long because only low neutron source strengths $\approx$ 10$^3$ n/sec could be used. Plastic scintillation detectors enable the use of low source strengths $>$ 10$^5$ n/sec, resulting in a reduction of assay time by $>$ 10. The use of the small interrogation source strength results in low radiation exposure to the operator of the instrument less than 0.1 mr/hr at 1 meter.

A random neutron source located inside the counter interrogates the sample, and a coincidence logic system is used to distinguish the random counts produced by the source from the coincidence neutron counts arising from the induced fission of $^{235}$U. The observed coincidence rate is proportional to the $^{235}$U content of the sample. To ensure uniform interrogation of the entire sample, the source is moved up and down at constant speed while the sample is rotated. Each plastic scintillation detector is shielded with Pb on its inner surface to reduce gamma ray interference to the assay. A $^3$He detector mounted inside the counter corrects for changes in neutron flux within the sample due to the presence of nonfissionable matrix material in the sample. In samples containing considerable amounts of hydrogenous material, for example, thermal neutron flux is increased and the induced fission rate is increased accordingly. The $^3$He detector monitors the flux and corrects for this effect.

SUMMARY OF THE INVENTION

A random neutron source inside the counter interrogates the sample and produces fissions in the fertile and fissile material within the sample. It is important that the source be truly random. The fission neutrons are detected with fast neutron detectors such as fast plastic scintillation detectors, or organic liquids, without prior moderation. The fast neutron detectors make possible short coincidence resolving times $\approx$ 50 nsec. A coincidence logic system is used to distinguish the random source neutrons from the time-correlated fission neutrons. Uranium-235 and $^{239}$Pu are assayed using a subthreshold (less than 1 MeV) random neutron source such as AmLi or PoLi; thus fissions will not be induced in $^{238}$U contained within the sample. Uranium-238 content can be measured using higher energy neutron sources such as AmB or AmF. Efforts are made to reduce the sensitivity of the detectors to gamma rays, with lead shielding, pulse shape discrimination, and fast timing considerations. Gamma ray coincidences occur in much shorter time intervals than do the neutron coincidences; thus by proper timing many gamma-gamma coincidences can be eliminated. This reduction of gamma sensitivity leads to a more reliable assay as the fission neutrons are considerably more penetrating in heavy matrix materials than are gamma rays. This gamma suppression is also useful in reducing cosmic ray coincidence background. Lead shielding is placed on the inner surfaces of the detectors completely covering the detectors. The inner surfaces of the lead shielding are completely covered with a thick layer of boron to absorb thermal neutrons inside the system. This layer of boron also reduces thermal criticality problems with the system. The random neutron source is located inside the counter in close proximity with the sample to be assayed. The close coupling between the source-sample-detector produces good sensitivity with minimum source intensity. In the system of this invention the sample was rotated while the source moved up and down to scan the entire sample. The use of weak source intensity, as mentioned above, leads to low radiation exposure to the operator of the system. A neutron detector such as $^3$He gas, BF$_3$ gas, or a fission chamber is positioned inside the counter and used to monitor the neutron flux within the counter and to make estimates of corrections to assay due to adsorption, moderation, etc. of the fission neutrons by material within the sample. Such a "flux monitor" is essential if the system is used to assay samples containing a wide variety of materials.

BRIEF DESCRIPTION OF THE DRAWING

The FIGURE is a perspective view of the system of this invention showing in partial cross section and schematically the components of said system.

DESCRIPTION OF THE PREFERRED EMBODIMENT

The FIGURE shows the random source interrogation system of this invention presently in use for assaying 2-liter samples using fast plastic scintillation detectors 4. A random neutron source 5 located inside the fast neutron coincidence counter is used to interrogate the sample containing the fissionable material. A coincidence logic unit 11 separates the counts produced by the random interrogation source from the coincidence neutrons from the induced fission events in fissionable material. Thus the observed coincidence rate is proportional to the fissionable content of the sample. Each plastic scintillator detector 4 has two photomultiplier tubes 8 and is shielded on the surface facing the sample with 1 inch of lead 2 to reduce gamma ray interference to the assay. A shadow shield of 1-inch steel 13 protects the detectors from the source 5. The coincidence efficiency of the system is $\approx$ 1.5 percent. A lead screw 6 produces the constant speed vertical translation of neutron source 5. A $^3$He detector 12 is mounted inside the counter on the wall of the boron shield 3 to correct for changes in neutron flux within the sample due to the presence of nonfissionable matrix material in the sample. If a sample contains a considerable amount of hydrogenous material, for example, the induced fission rate will be increased accordingly. The high-sensitivity $^3$He detector 12 monitors this thermal neutron flux and corrects for this matrix material effect. The fast plastic scintillation detectors 4 consist of organic fluors in a matrix of polyvinyltoluene having a light decay constant of less than 3 nsec although other material with this decay constant can be used. The two scintillation detectors 4 are identical in size, 2 inches thick, 10 inches wide, and 24 inches high. The detectors are viewed with fast photomultiplier tubes 8 that have anode-pulse rise times of less than 5 nsec and spectral response characteristics similar to the output of the plastic scintillators used for the neutron detectors. There are two photomultiplier tubes per detector, each phototube having a 2-inch diameter photocathode. The lead shielding 2 on the inner surfaces of the detectors is 1 inch thick, 10 inches wide, and 24 inches high, completely covering the detectors. The inner surfaces of the lead shielding 2 are completely covered with a one-fourth-inch-thick layer of boron 3 to absorb thermal neutrons inside the system. This layer of boron also reduces thermal criticality problems with the system.

Total system weight is $\approx$ 800 lbs; the instrument is mounted on wheels (not shown) for easy mobility and is contained in a steel box 1 with 1-inch-thick walls which may be fitted with doors or removable top lid (not shown) to make sample access easier. The thick steel is a good fast neutron reflector, increasing the sensitivity of the instrument.

The coincidence logic system 11 is made entirely of EG&G M-100 fast nuclear instrumentation components not considered part of this invention. Two output channels are provided: (1) a "real + accidental" channel that records the sum of the actual coincidence counts from the induced fissions in the fissionable material plus any accidental coincidence counts caused by random events occurring within the coincidence resolving time, and (2) an "accidental" channel that records the number of accidentally produced coincidences. The difference between the "real + accidental" scaler reading and the "accidental" scaler reading is the number of real coincidences observed, which is proportional to the number of induced fissions plus any background coincidence counts, e.g., from cosmic rays.

A novel feature of this instrument is a method of gamma ray rejection by proper fast timing considerations. Coincidence events that are produced by gamma rays will be very fast: i.e., the two coincidence gamma rays will be detected within a few nanoseconds of each other (< 10 nsec). On the other hand, coincidence neutrons will be detected over a much longer time span because of their slower speed ($\approx$ one-tenth speed of light) and the finite die-away time of the neutrons within the system. Thus by discarding the first $\approx$ 10 nsec of the coincidence counting time, but retaining the remaining coincidence time, the gamma ray coincidence events can be reduced or eliminated.

The random neutron source 5 preferred for assay of fissile material, e.g., $^{235}$U, $^{239}$Pu, is AmLi having a source strength of $\approx 10^5$ n/sec, because of the long 458-year half life, although PoLi, with a 138-day half life, can also be used. The neutron energy of these sources are subthreshold (< 1 MeV); thus fissions will be induced only in the fissile content of the samples. For assay of the fertile content of the samples, neutron sources having higher energy must be used, such as AmF or AmB. Gamma rays from the source are shielded from the detectors by lead shielding 2 and additional 1-inch-steel shielding 13.

In order to properly interrogate all regions of the sample the random source should in effect be evenly distributed around the periphery of the sample. This can be accomplished by rotation of the sample located on turntable 9 driven by motor 7 by shaft 10 coupled with vertical translation of the source along the side of the sample. The FIGURE shows the main features of such an assay system. The simplicity and reliability of the coincidence method, combined with random neutron source interrogation, makes this assay system very attractive for isotopic assay of fissionable material.

Samples are assayed with this instrument in the following manner: the sample to be assayed is placed on the rotating turntable 9, the vertical up-down motion of the source 5 is adjusted to span the total height of the sample in a time period of 100 sec, the coincidence logic system then counts for some multiple of 100 sec, typically 200 or 400 sec. The required assay time depends on the amount of material in the sample and the desired assay precision. It takes, for example, 100 sec to obtain a 10 g standard deviation in the assay of a 2-liter sample containing 200 g of $^{235}$U. Table I summarizes assay results obtained on five 2-liter samples containing high enriched uranium. The assay times were 400 sec for the heavy samples and 1,000 sec for the light samples.

TABLE I

Assay of Uranium Samples Using Random Source Interrogation and Neutron Coincidence Counting $^{235}$U (g)

| Sample | Assay | Actual |
|---|---|---|
| 1 | 245 | 249 |
| 2 | 107 | 109 |
| 3 | 25 | 21 |
| 4 | 13 | 12 |
| 5 | 6 | 6 |

In order to assay $^{240}$Pu, regular coincidence counting can be done without the random source, but to assay $^{239}$Pu the random source must be used. Table II shows results obtained for assay of 1-gallon containers containing both $^{239}$Pu and $^{240}$Pu.

TABLE II

Assay of Plutonium Samples Using the Random Source Interrogation and Standard Coincidence Counting

| Sample | $^{239}$Pu (g) Assay | $^{239}$Pu (g) Actual | $^{240}$Pu (g) Assay | $^{240}$Pu (g) Actual |
|---|---|---|---|---|
| 1 | 50 | 45 | 2.9 | 2.2 |
| 2 | 37 | 38 | 2.0 | 1.9 |

The fertile content of samples can be assayed in a similar manner, but a high energy neutron source (> 1 MeV) must also be used.

Mathematical analysis of the system has shown the following results:

1. The strength of the random neutron source need not be large; $\approx 10^5$ n/sec is sufficient for most assay problems.
2. The assay time is directly proportional to the coincidence resolving time. This points up the importance of having a neutron counter with a short die-away time.
3. The assay time is inversely proportional to the square of the detector efficiency, hence the importance of the high detector efficiency.

What I claim is:

1. An improved random interrogation system to assay fissionable material having a sample container, a means of rotating the sample, a random neutron source located inside the system that scans the sample, at least two fast neutron plastic scintillation detectors with a gamma ray shield of lead combined with a $^3$He flux monitor, a fast neutron reflector of steel housing the said system and a second steel shield that is interposed between the said source and detectors, and a coincidence logic system electrically connected to said detectors by means of fast photomultiplier tubes, said improvement comprising an absorbing thermal neutron shield, and the neutron source being less than 1 MeV for the assay of fissile isotopes and greater than 1 MeV for fertile isotopes.

2. The interrogation system of claim 1 in which the said thermal neutron shield is a plate of boron approximately one-fourth inch thick.

3. The interrogation system of claim 1 in which the said neutron source for the assay of fissile isotopes is selected from the class consisting of AmL: and PoLi.

4. The interrogation system of claim 1 in which the said neutron source for the assay of fertile isotopes is selected from the class consisting of AmB and AmF.

5. The interrogation system of claim 3 in which the said neutron source is AmLi.

6. The interrogation system of claim 4 in which the said neutron source is AmB.

* * * * *